US012044390B1

(12) United States Patent
Han

(10) Patent No.: US 12,044,390 B1
(45) Date of Patent: Jul. 23, 2024

(54) POWER ADAPTER FOR STRIP LIGHTS WITH CONTROL FUNCTION

(71) Applicant: Dongguan Lixing Lighting Co., Ltd., Dongguan (CN)

(72) Inventor: Xiao Han, Dongguan (CN)

(73) Assignee: Dongguan Lixing Lighting Co., Ltd., Dongguan (CN)

( * ) Notice: Subject to any disclaimer, the term of this patent is extended or adjusted under 35 U.S.C. 154(b) by 0 days.

(21) Appl. No.: 18/243,018

(22) Filed: Sep. 6, 2023

(51) Int. Cl.

| | |
|---|---|
| ***F21V 23/00*** | (2015.01) |
| ***F21S 4/00*** | (2016.01) |
| ***F21S 4/20*** | (2016.01) |
| ***F21V 23/04*** | (2006.01) |
| ***F21W 121/00*** | (2006.01) |

(52) U.S. Cl.
CPC .......... *F21V 23/006* (2013.01); *F21V 23/008* (2013.01); *F21V 23/0435* (2013.01); *F21V 23/045* (2013.01); *F21S 4/00* (2013.01); *F21S 4/20* (2016.01); *F21V 2200/30* (2015.01); *F21W 2121/00* (2013.01)

(58) Field of Classification Search
CPC .. F21V 23/006; F21V 23/008; F21V 2200/30; F21V 23/0435; F21V 23/045; F21S 4/20; F21S 4/00; F21S 4/10; F21W 2121/00
See application file for complete search history.

(56) References Cited

U.S. PATENT DOCUMENTS

| | | | | |
|---|---|---|---|---|
| 10,281,119 B2 * | 5/2019 | Ford | F21S 9/02 | |
| 2012/0014108 A1 * | 1/2012 | Greenfield | F21V 15/013 | 362/373 |
| 2015/0092449 A1 * | 4/2015 | Demuynck | F21V 29/508 | 362/649 |
| 2015/0159844 A1 * | 6/2015 | Flaherty | F21S 4/10 | 362/249.02 |

FOREIGN PATENT DOCUMENTS

| | | |
|---|---|---|
| CN | 216565652 U | 5/2022 |
| CN | 216716136 U | 6/2022 |
| CN | 218006666 U | 12/2022 |

* cited by examiner

*Primary Examiner* — Alan B Cariaso
(74) *Attorney, Agent, or Firm* — George D. Morgan

(57) ABSTRACT

Provided is a power adapter for strip lights having a control function, comprising a main housing, a PCBA, wires, and pins; wherein one end of the wire is electrically connected to the PCBA while the other end is provided with a connection seat for connecting strip lights; the pins partially protrude out of the front face of the main housing; the PCBA is electrically connected with an indicator light which partially protrudes out of the rear face of the main housing; the PCBA has a main control unit which is connected with a power management module, a light control module, an infrared receiver, and a wireless communication module.

9 Claims, 9 Drawing Sheets

POWER ADAPTER FOR STRIP LIGHTS WITH CONTROL FUNCTION

TECHNICAL FIELD

The present disclosure relates to a power adapter for strip lights having a control function.

BACKGROUND

The descriptions herein only provide background information in relation to the present invention, and do not necessarily constitute the prior art.

The existing strip lights generally have color rendering effects of different colors and rhythms. In most cases, for adapting to external power sources (such as household power supplies) strip lights are electrically connected to external power supplies through power adapters. Moreover, in order to enable remote operation, strip lights may also be equipped with a control box, to which consumers send control signals using a remote control.

The presence of power adapters and control boxes may cause the problem of tidying up multiple wires when arranging these strip lights and may result in cumbersome operations. Moreover, during packaging and transportation, the packaging volume of an entire set of strip light components increases due to the presence of a control box, thereby requiring more packaging materials and undoubtedly increasing packaging costs, which is detrimental to environmental protection.

Moreover, the existing power adapters have no decorative function in appearance and cannot meet the needs of modern young people.

Therefore, there is a need of developing a novel technical solution to solve the aforementioned problems.

SUMMARY

In an attempt to solve the above-mentioned defects and shortcomings in the prior art, the present invention provides a power adapter for strip lights having a control function, which is integrated with a light control module, an infrared receiver, and a wireless communication module on a printed circuit board assembly (PCBA) of the adapter, such that there is no need to configure a light control box, making the installation and use of strip lights more convenient, rendering strip lights a more compact packaging volume, saving transportation costs, and making transportation more economical.

For the aforesaid purpose, the present invention employs the following technical solution:

a power adapter for strip lights having a control function, comprising a main housing, a PCBA, wires, and pins; wherein said main housing is made of plastic; said PCBA is configured in the main housing; one end of said wire is electrically connected to said PCBA while the other end extends to the outside of said main housing, and the end of said wire away from said PCBA is provided with a connection seat for connecting strip lights; said pins are electrically connected to said PCBA and partially protrude out of the front face of said main housing; said PCBA is electrically connected with an indicator light which partially protrudes out of the rear face of said main housing;

and, there are two of said pins configured in the vertical direction; and said PCBA has a main control unit which is connected with a power management module, a light control module, an infrared receiver, and a wireless communication module;

said main housing is a cuboid having a cartridge body and a cover body; wherein said cartridge body has a mounting cavity with a front opening, and said cover body covers the opening of said mounting cavity; said cartridge body is provided with an accommodating recess adapted to said cover body at the position corresponding to the opening of said mounting cavity, and said cover body is mounted to said accommodating recess; the lower side of said accommodating recess is provided with a first clearance hole for passing wires through, and the front end of said first clearance hole is configured open;

Alternatively, said cartridge body has a mounting cavity with a back opening, and said cover body covers the opening of said mounting cavity; said cartridge body is provided with an accommodating recess adapted to said cover body at the position corresponding to the opening of said mounting cavity, and said cover body is mounted to said accommodating recess; the lower side of said accommodating recess is provided with a first clearance hole for passing wires through, and the rear end of said first clearance hole is configured open.

In some embodiments, said cover body is mounted to said accommodating recess via ultrasonic welding.

In some embodiments, said cartridge body is made of an ABS or PVC material, and said cover body is made of an ABS or PVC material.

In some embodiments, at least two of said wires are configured, each of which is provided with a connection seat.

In some embodiments, one side face of said main housing is provided with an accommodating slot which is mounted with a decorative light set comprising a light source assembly, a reflective mirror, a semi-transparent, semi-reflective mirror, and a frame support; wherein said reflective mirror is mounted on one side of said frame support close to the main housing; said semi-transparent, semi-reflective mirror is mounted on one side of said frame support away from the main housing; said reflective mirror, said frame support and said semi-transparent, semi-reflective mirror are arranged in a circle to form a light cavity, and said light source assembly is mounted in the light cavity.

In some embodiments, said light source assembly comprises an annular light guide frame and a strip light surrounding said light guide frame.

In some embodiments, said light guide frame comprises a fluorescent powder.

In some embodiments, said accommodating slot is provided with a disassembly gap for sliding said decorative light set out.

In some embodiments, said decorative light set is magnetically engaged to said accommodating slot; or, said decorative light set is adherently (粘贴) engaged to said accommodating slot.

Compared with the prior art, the present invention has significant advantages and beneficial effects. To be specified: with reference to the foregoing technical solutions, the present invention is integrated with a light control module, an infrared receiver, and a wireless communication module on a PCBA of the adapter, such that there is no need to configure a light control box, making the installation and use of strip lights more convenient, rendering strip lights a more compact packaging volume, saving transportation costs, and making transportation more economical.

Moreover, the rational design of the main housing offers several advantages, such as easy manufacturing and processing, secure connection, and good product consistency.

In order to illustrate the structural features and effects of the present invention more clearly, the present invention will be described in detail below in combination with the accompanying drawings and specific embodiments.

DESCRIPTION OF REFERENCE SIGNS IN DRAWINGS

Figure 1:
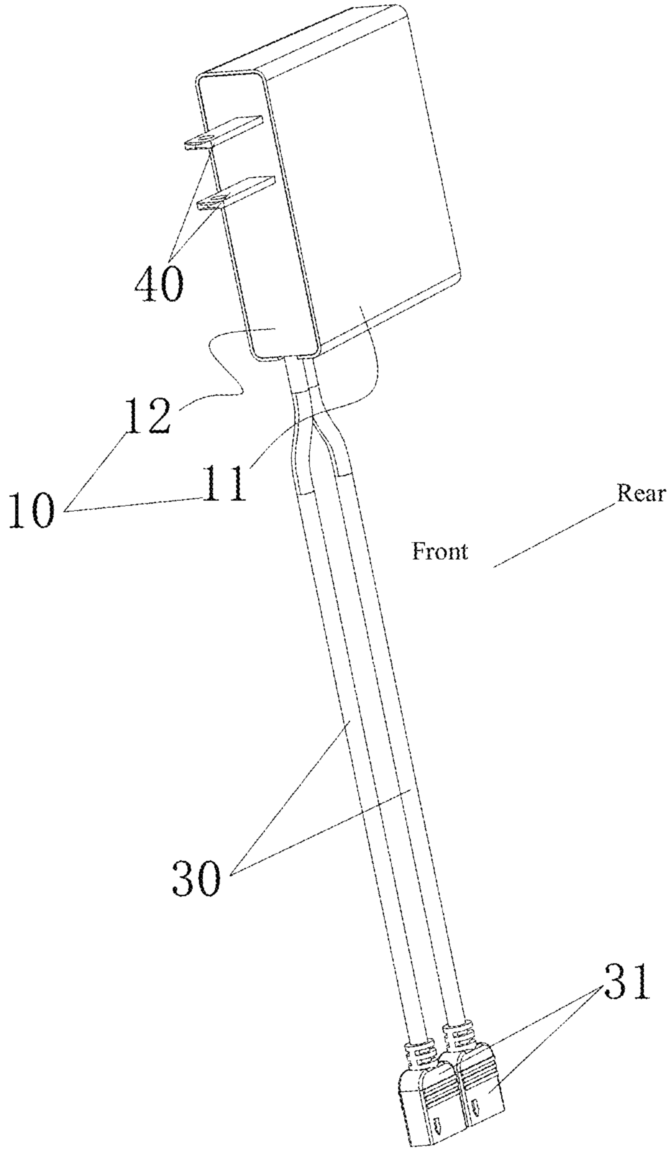
FIG. 1 is a three-dimensional schematic view of Embodiment 1 of the present invention.
Figure 2:
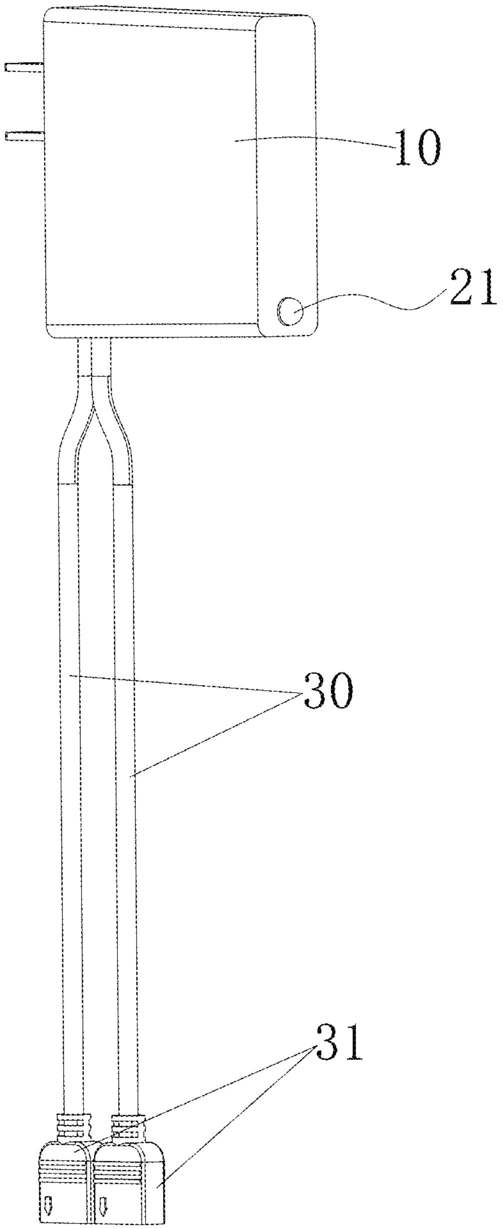
FIG. 2 is another three-dimensional schematic view of Embodiment 1 of the present invention from a different angle.
Figure 3:
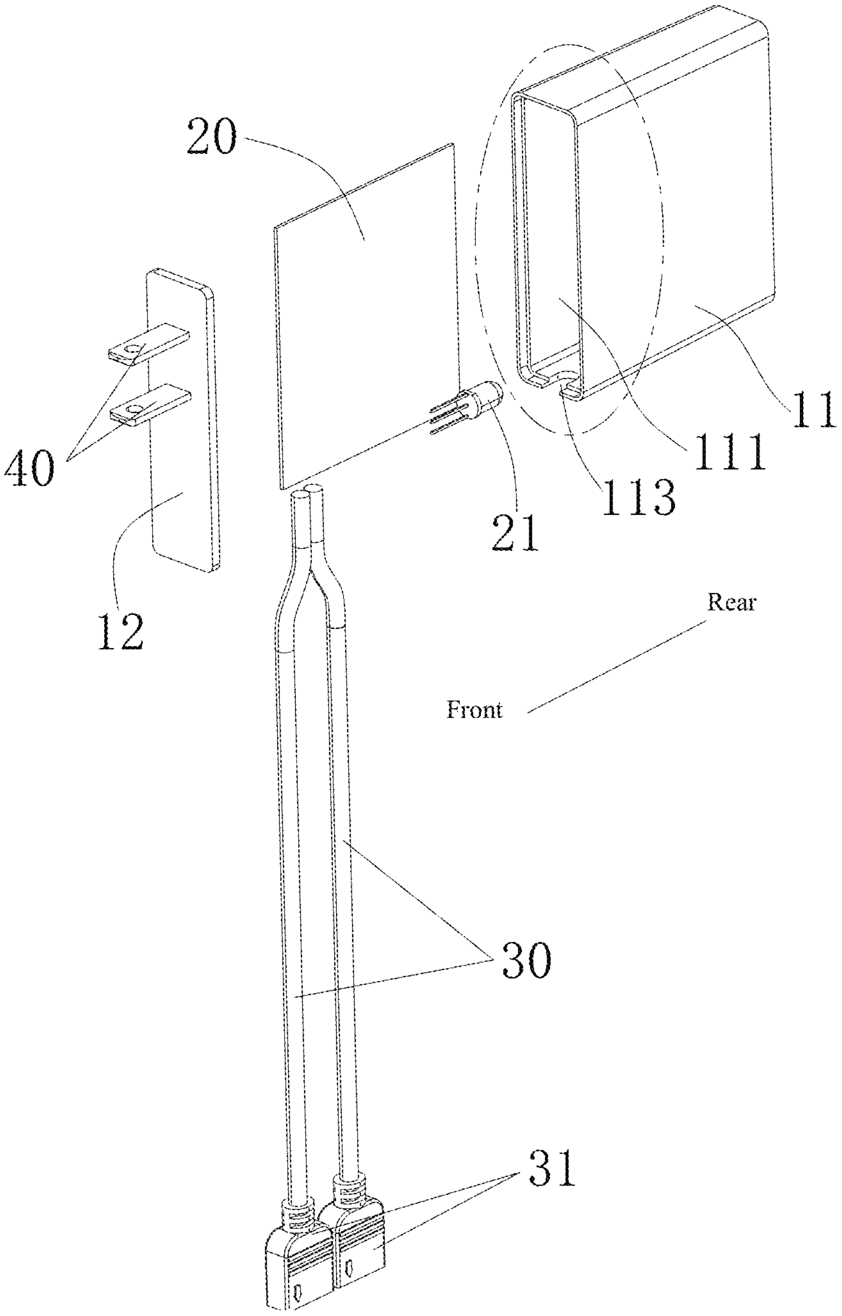
FIG. 3 is a first exploded view of Embodiment 1 of the present invention.
Figure 4:
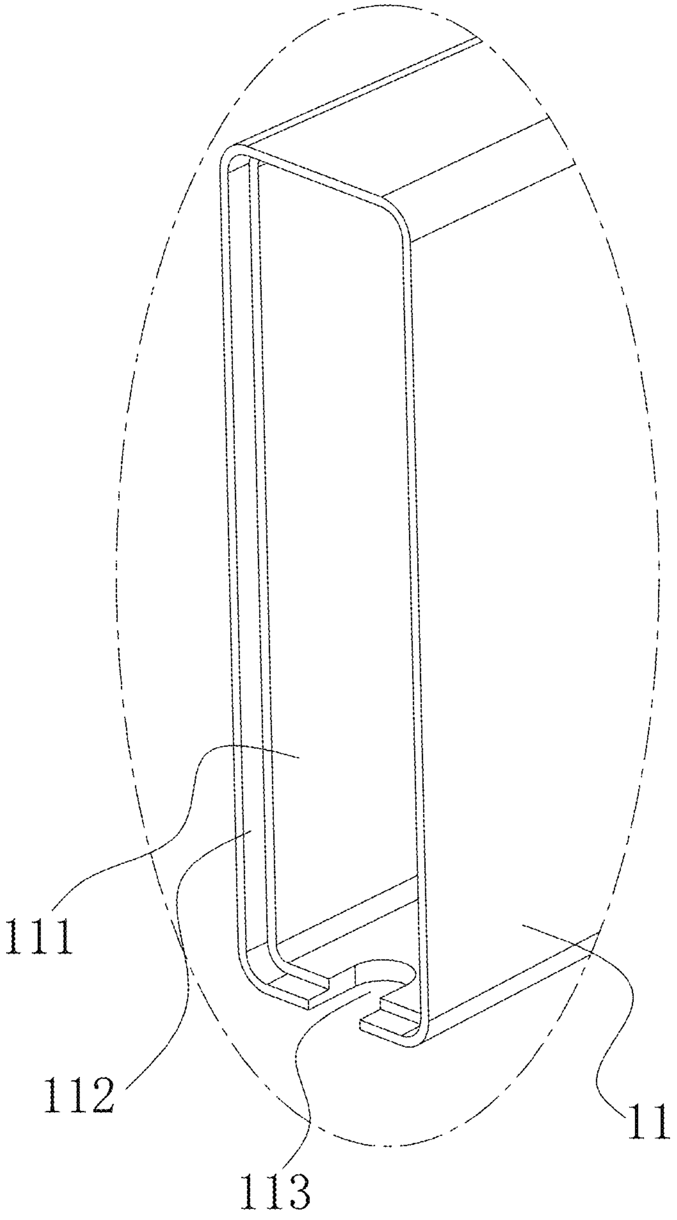
FIG. 4 is an enlarged view of a part of FIG. 3.
Figure 5:
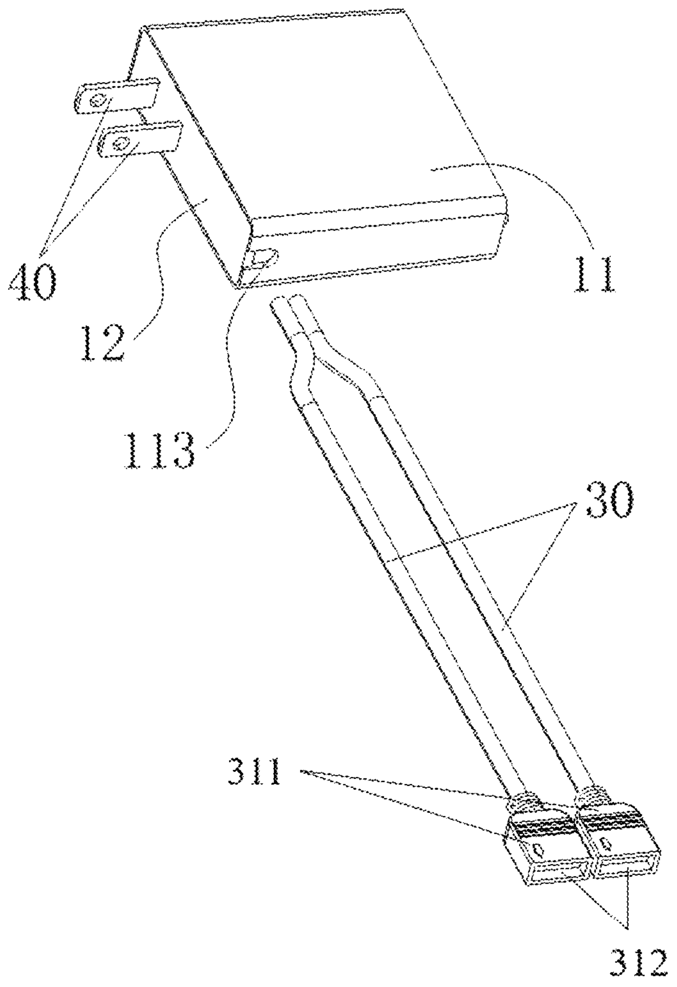
FIG. 5 is a second exploded view of Embodiment 1 of the present invention.
Figure 6:
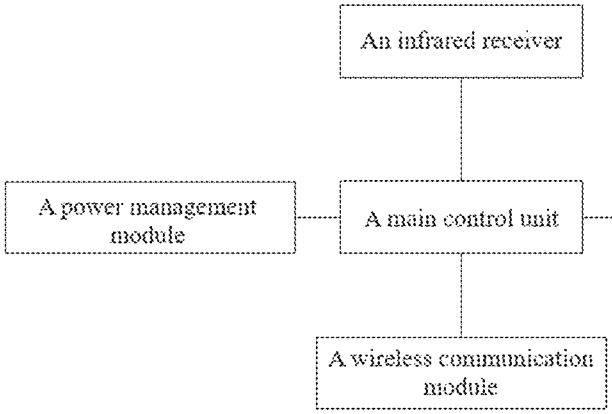
FIG. 6 is a block diagram of Embodiment 1 of the present invention showing the control principle.
Figure 7:
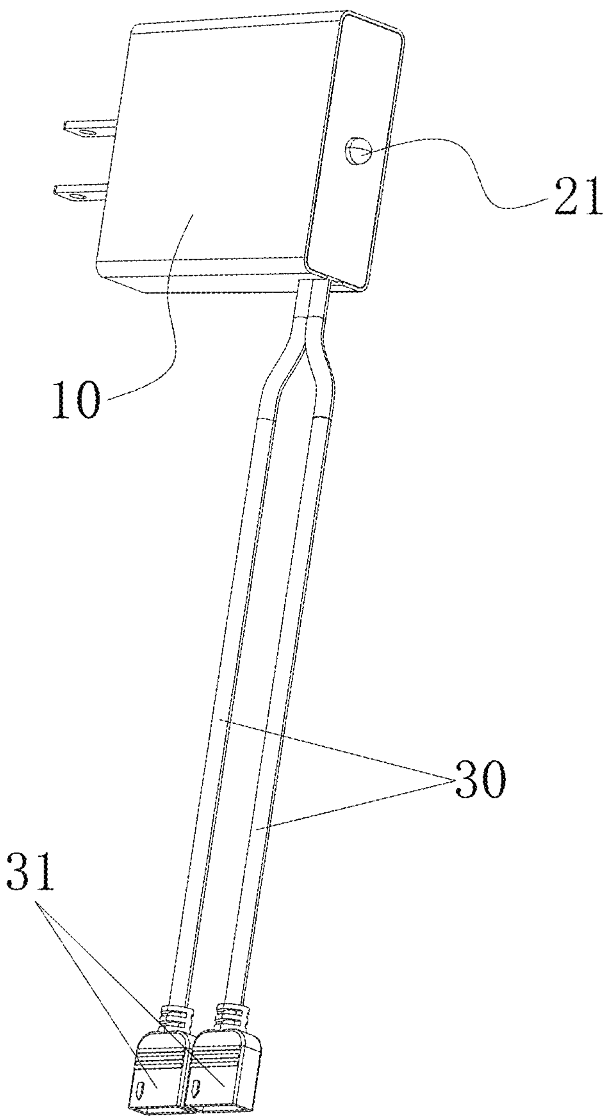
FIG. 7 is a three-dimensional schematic view of Embodiment 2 of the present invention.
Figure 8:
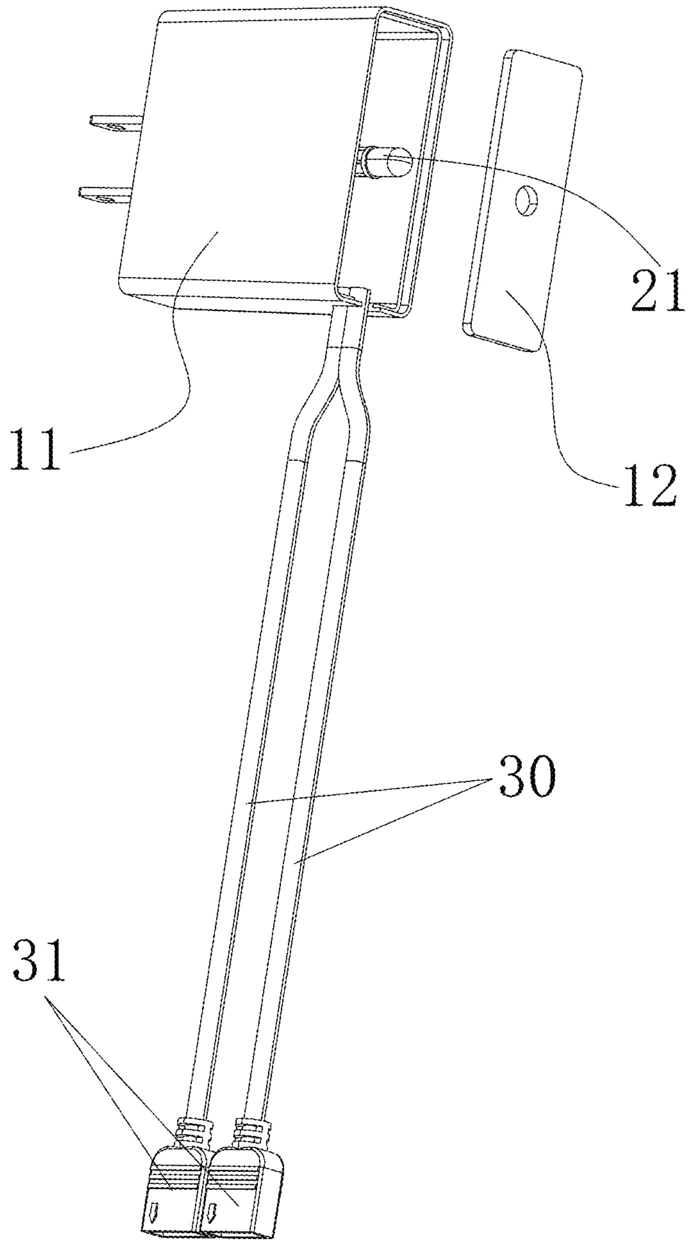
FIG. 8 is an exploded view of Embodiment 2 of the present invention.

10. main housing; 11. cartridge body; 111. mounting cavity; 112. accommodating recess; 113. first clearance hole; 12. cover body; 13. accommodating slot; 131. disassembly gap; 20. PCBA; 21. indicator light; 30. wires; 31. connection seat; 311. plastic shell; 312. insert cavity; 40. pins; 51. light source assembly; 511. light guide frame; 512. strip light; 52. reflective mirror; 53. semi-transparent, semi-reflective mirror; 54. frame support.

DETAILED DESCRIPTION OF THE EMBODIMENTS

The technical solutions in the embodiments of the present invention are clearly and completely described below with reference to the accompanying drawings. Apparently, the described embodiments are merely preferred embodiments of the present invention.

It should be noted that when an element is referred to as being "immobilized" to another element, it may be immobilized to another element, directly or via an intermediate element(s). When an element is referred to as being "connected" to another element, it may be connected to another element, directly or via an intermediate element(s). The terms "vertical," "horizontal," "left," "right," and the like used herein are for the purpose of illustration only and do not indicate these embodiments exclusively.

Unless otherwise defined, all technical and scientific terms used herein have the same meaning as commonly understood by persons of ordinary skill in the technical field of the present invention. The terms used herein are only for the purpose of describing specific embodiments, rather than intended to limit the present invention. The term "and/or" as used herein includes any and all combinations of one or more of the related items as listed.

Referring to FIG. 1 to FIG. 9, a power adapter for strip lights having a control function in the embodiment of the present invention comprises a main housing 10, a PCBA 20, wires 30, and pins 40; wherein said main housing 10 is made of plastic; said PCBA 20 is configured in said main housing 10; one end of said wire 30 is electrically connected to said PCBA 20 while the other end extends to the outside of said main housing 10, and the end of said wire 30 away from said PCBA 20 is provided with a connection seat 31 for connecting strip lights; said pins 40 are electrically connected to said PCBA 20 and partially protrude out of the front face of said main housing 10; said PCBA is electrically connected with an indicator light 21 which partially protrudes out of the rear face of said main housing 10; and There are two of said pins 40 configured in the vertical direction; said PCBA 20 has a main control unit which is connected with a power management module, a light control module, an infrared receiver, and a wireless communication module (typically a Bluetooth wireless communication module and a WIFI wireless communication module).

In use, the connection seat 31 is conductively connected to strip lights, and the pins 40 are plugged into the power socket, so as to supply power to strip lights. Moreover, users may also use the infrared transmitter on the remote control (controller) to establish contact with the main control unit, allowing them to control strip lights. Alternatively, contact with the main control unit may be established via mobile phone Bluetooth, Wi-Fi, etc., ultimately enabling users to control strip lights. As such, compared with the existing strip lights that require an additional light controller, the present invention simplifies the product structure, making the installation and use of strip lights more convenient, rendering strip lights a more compact packaging volume, saving transportation costs, and making transportation more economical.

In actual applications, said main housing 10 is a cuboid having a cartridge body 11 and a cover body 12. In most cases, said cartridge body 11 has a mounting cavity 111 with a front opening, and said cover body 12 covers the opening of said mounting cavity 111; said cartridge body 11 is provided with an accommodating recess 112 adapted to said cover body 12 at the position corresponding to the opening of said mounting cavity 111, and said cover body 12 is mounted to said accommodating recess 112; the lower side of said accommodating recess 112 is provided with a first clearance hole 113 for passing wires 30 through, and the front end of said first clearance hole 113 is configured open;

Alternatively, said cartridge body 11 has a mounting cavity 111 with a back opening, and said cover body 12 covers the opening of said mounting cavity 111; said cartridge body 11 is provided with an accommodating recess 112 adapted to said cover body 12 at the position corresponding to the opening of said mounting cavity 111, and said cover body 12 is mounted to said accommodating recess 112; the lower side of said accommodating recess 112 is provided with a first clearance hole 113 for passing wires 30 through, and the rear end of said first clearance hole 113 is configured open. Said cover body 12 is mounted to said accommodating recess 112 via ultrasonic welding. Said cartridge body 11 is made of an ABS or PVC material, and said cover body 12 is made of an ABS or PVC material. Hence, the rational design of the main housing 10 offers several advantages, such as easy manufacturing and processing, secure connection, and good product consistency.

Typically, at least two of said wires 30 are configured, each of which is provided with a connection seat 31. Further, said connection seat 31 comprises a plastic shell 311 that houses an insert cavity 312, and the interior of said insert cavity 312 is provided with a plurality of connection terminals which are typically made of a copper material.

Figure 9:
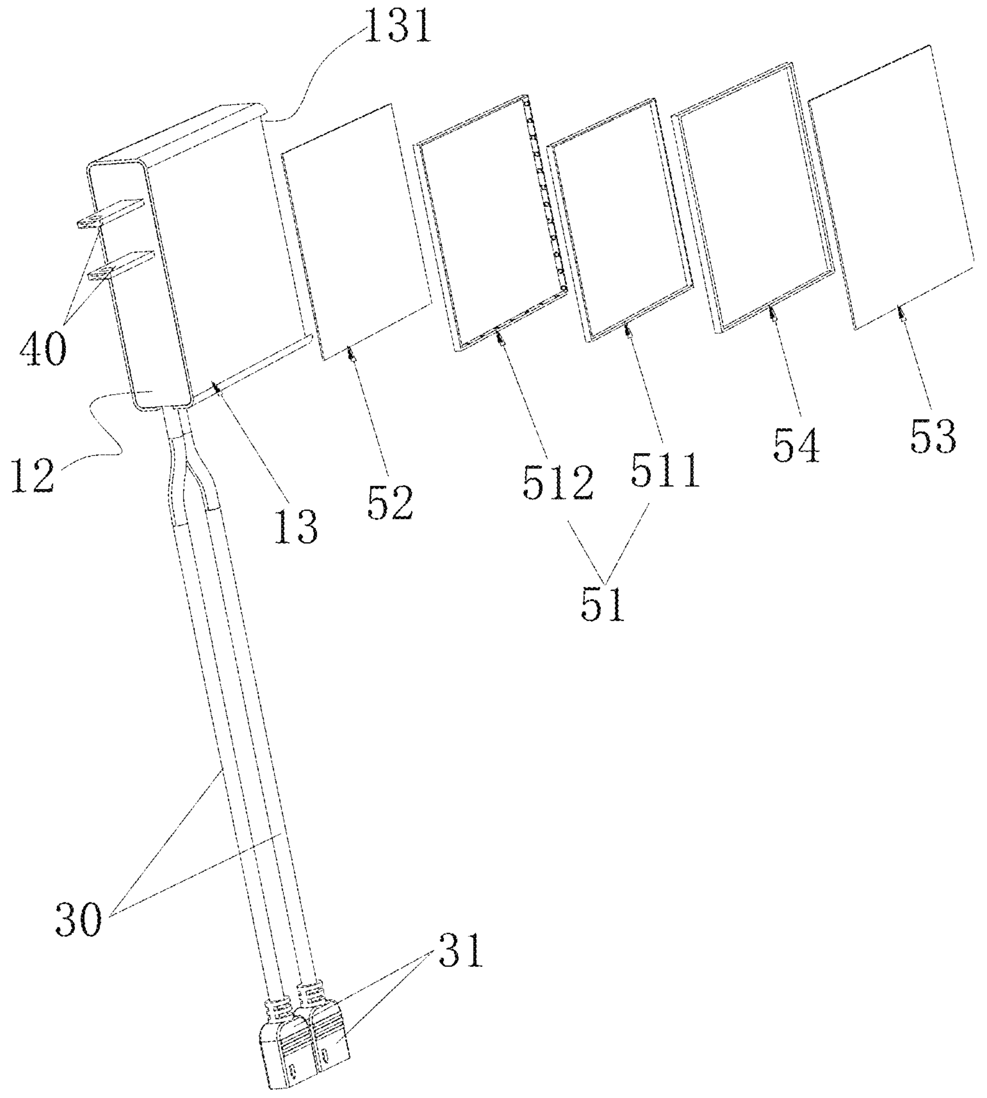
FIG. 9 is an exploded view of Embodiment 3 of the present invention.

Referring to FIG. 9, in other embodiments, one side face of said main housing 10 is provided with an accommodating slot 13 which is mounted with a decorative light set comprising a light source assembly 51 (which is electronically connected to said PCBA 20), a reflective mirror 52, a semi-transparent, semi-reflective mirror 53, and a frame support 54; wherein said reflective mirror 52 is mounted on one side of said frame support 54 close to the main housing 10; said semi-transparent, semi-reflective mirror 53 is mounted on one side of said frame support 54 away from the main housing 10; said reflective mirror 52, said frame support 54 and said semi-transparent semi-reflective mirror 53 are arranged in a circle to form a light cavity, and said light source assembly 51 is mounted on the inner wall of said light cavity (i.e., the inner wall of the frame support 54). When the light source assembly 51 lights up, the light emitted by the light source assembly 51 is repeatedly reflected between the reflective mirror 52 and the semi-transparent, semi-reflective mirror 53, thereby creating a sight of different levels of brightness, which is more fashionable and more caters to the modern aesthetic preferences of young people, and further enhancing users' experience.

It should be noted that said light source assembly 51, said reflective mirror 52, and semi-transparent semi-reflective mirror 53 are all configured on said frame support 54 by adhesion without using any fastener, so that the pleasing appearance of the main housing 10 is not affected and an advantage of easy assemble is also conferred.

Said light source assembly 51 comprises an annular light guide frame 511 and a strip light 512 surrounding said light guide frame 511. When the strip light 512 is on, it allows the entire light guide frame 511 to emit light evenly, thereby improving even light output of the light source assembly 51. Preferably, said light guide frame 512 comprises a fluorescent powder, so that the light guide frame 512 has star-like refraction points.

Said accommodating slot 13 is provided with a disassembly gap 131 for sliding the decorative light set out. In need of disassembly, the decorative light set is pushed out from the disassembly gap 131, so that the removal of the decorative light set is completed, which is very convenient. The configuration of the accommodating slot 13 on the main housing 10 also has the advantage of guaranteeing the side face of the main housing 10 flat.

Of course, said decorative light set may also be magnetically engaged to (the bottom/wall of) said accommodating slot 13, or alternatively said decorative light set may be adherently engaged to said accommodating slot 13, so as to facilitate immobilization of the decorative light set.

The design of the present invention focuses on integration of a light control module, an infrared receiver, and a wireless communication module on a PCBA of the adapter, such that there is no need to configure a light control box, making the installation and use of strip lights more convenient, rendering strip lights a more compact packaging volume, saving transportation costs, and making transportation more economical.

Moreover, the rational design of the main housing offers several advantages, such as easy manufacturing and processing, secure connection, and good product consistency.

Again, by providing the decorative light set on the main housing, when the decorative light set is on, the light emitted by the light source assembly is repeatedly reflected between the reflective mirror and the semi-transparent semi-reflective mirror, thereby to creating a sight of different levels of brightness, which is more fashionable and more caters to the aesthetic preferences of modern young people, and further enhancing users' experience;

And, the specific design of a decorative light set has many advantages such as easy assembly and good flatness of a main housing.

The above descriptions are merely preferred embodiments of the present invention, and shall not be construed as limitation to the technical scope of the present invention. Hence, any minor amendments, equivalent variations or modifications made to these embodiments according to the technical substance of the present invention shall still fall within the scope of technical solutions of the present invention.

What is claimed is:

1. A power adapter for strip lights having a control function, comprising a main housing, a printed circuit board assembly (PCBA), wires, and pins; wherein said main housing is made of plastic; said PCBA is configured in the main housing; one end of one wire of said wires is electrically connected to said PCBA while another end of the one wire extends to the outside of said main housing, and the another end of the one wire away from said PCBA is provided with a connection seat for connecting strip lights; said pins are electrically connected to said PCBA and partially protrude out of the front face of said main housing; said PCBA is electrically connected with an indicator light which partially protrudes out of the rear face of said main housing;

two of said pins are configured in the vertical direction; and said PCBA has a main control unit which is connected with a power management module, a light control module, an infrared receiver, and a wireless communication module; said main housing is a cuboid having a cartridge body and a cover body; wherein:

said cartridge body has a mounting cavity with a front opening, and said cover body covers the front opening of said mounting cavity; said cartridge body is provided with an accommodating recess adapted to said cover body at the position corresponding to the front opening of said mounting cavity, and said cover body is mounted to said accommodating recess; the lower side of said accommodating recess is provided with a first clearance hole for passing said wires through, and the front end of said first clearance hole is configured open; or said cartridge body has a mounting cavity with a back opening, and said cover body covers the back opening of said mounting cavity; said cartridge body is provided with an accommodating recess adapted to said cover body at the position corresponding to the back opening of said mounting cavity, and said cover body is mounted to said accommodating recess; the lower side of said accommodating recess is provided with a first clearance hole for passing said wires through, and the rear end of said first clearance hole is configured open.

2. The power adapter for strip lights having a control function according to claim 1, wherein said cover body is mounted to said accommodating recess via ultrasonic welding.

3. The power adapter for strip lights having a control function according to claim 2, wherein said cartridge body is made of an ABS or PVC material, and said cover body is made of an ABS or PVC material.

4. The power adapter for strip lights having a control function according to claim 3, characterized in that wherein at least two of said wires are configured, each of which is provided with the connection seat.

5. The power adapter for strip lights having a control function according to claim 3, wherein one side face of said main housing is provided with an accommodating slot which is mounted with a decorative light set comprising a light source assembly, a reflective mirror, a semi-transparent, semi-reflective mirror, and a frame support; wherein said reflective mirror is mounted on one side of said frame support close to the main housing; said semi-transparent, semi-reflective mirror is mounted on one side of said frame support away from the main housing; said reflective mirror, said frame support and said semi-transparent, semi-reflective mirror are arranged in a circle to form a light cavity, and said light source assembly is mounted in the light cavity.

6. The power adapter for strip lights having a control function according to claim 5, wherein said light source assembly comprises an annular light guide frame and a strip light surrounding said light guide frame.

7. The power adapter for strip lights having a control function according to claim 6, wherein said light guide frame comprises a fluorescent powder.

8. The power adapter for strip lights having a control function according to claim 6, wherein said accommodating slot is provided with a disassembly gap for sliding said decorative light set out.

9. The power adapter for strip lights having a control function according to claim 7, wherein said decorative light set is magnetically engaged to said accommodating slot; or said decorative light set is adherently engaged to said accommodating slot.

* * * * *